United States Patent
Chen et al.

(10) Patent No.: US 7,075,930 B1
(45) Date of Patent: Jul. 11, 2006

(54) SYSTEM AND METHOD FOR PACKET DATA SERVICING NODE (PDSN) INITIAL ASSIGNMENT AND RESELECTION

(75) Inventors: Ning Nicholas Chen, San Diego, CA (US); Henrik Basilier, Kensington, CA (US); Vibhor Julka, San Diego, CA (US); Roger Gustavsson, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/546,823

(22) Filed: Apr. 11, 2000

(51) Int. Cl.
*H04L 12/28* (2006.01)

(52) U.S. Cl. ............................. 370/392; 370/400

(58) Field of Classification Search ............ 370/328, 370/338, 349, 389, 392, 400, 401
See application file for complete search history.

(56) References Cited

U.S. PATENT DOCUMENTS

| | | | |
|---|---|---|---|
| 6,233,458 B1* | 5/2001 | Haumont et al. | 455/445 |
| 6,404,754 B1* | 6/2002 | Lim | 370/338 |
| 6,415,151 B1* | 7/2002 | Kreppel | 370/338 |
| 6,567,667 B1* | 5/2003 | Gupta et al. | 455/445 |
| 6,580,699 B1* | 6/2003 | Manning et al. | 370/331 |
| 6,603,763 B1* | 8/2003 | Koshino | 370/389 |
| 6,834,050 B1* | 12/2004 | Madour et al. | 370/392 |

FOREIGN PATENT DOCUMENTS

WO WO 01/67786 9/2001

OTHER PUBLICATIONS

Lim Ph.D., Byung-Keun, Chang, Woon-Suk, "Consideration for PDSN Selection in 3G-IOS4.1-Reversion of AC-19990726-009" *Third Generation Partnership Project 2* Jul. 26-Jul. 30, 1999, 5 pages.

Freter, Karl, Campbell, Ed, Xu, Yingchun, "Fast RN Hard Handoff Procedure for the Ix (R-P) Interface", *Third Generation Partnership Project 2*, Mar. 13, 2000, 6 pages.

"3GPP2 Access Network Interfaces Interoperability Specification Release A", Jan. 18, 2000, pp. 111-183.

* cited by examiner

*Primary Examiner*—Andrew C. Lee
(74) *Attorney, Agent, or Firm*—Coats & Bennett, P.L.L.C.

(57) ABSTRACT

An method for PDSN (Packet Data Serving Node) initial assignment and re-selection in a wireless communication system is provided. The method is implemented in PCF (Packet Control Function) within a third-generation (3G) CDMA Radio Access Network (RAN). The methodology reduces the number of point-to-point (PPP) re-establishments, when a Mobile Station (MS) roams to a different packet zone/PCF. The method generates a table of PDSN identification numbers cross-referenced to the PDSN Internet protocol (IP) addresses, residing with each PCF. A PDSN Id number is selected from the table using the MS IMSI (International Mobile Station Identifier) as a key to perform the selection. The present invention methodology addresses the issue of forward and backward compatibility, scalability, reliability, and load sharing in the PDSN selection.

26 Claims, 3 Drawing Sheets

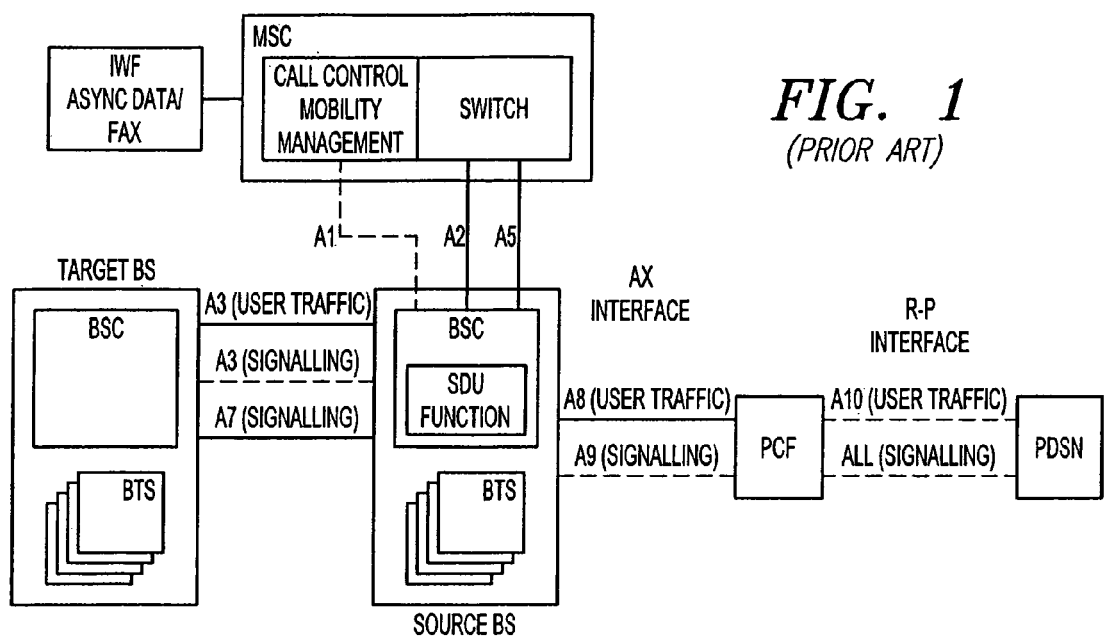
*FIG. 1*
(PRIOR ART)
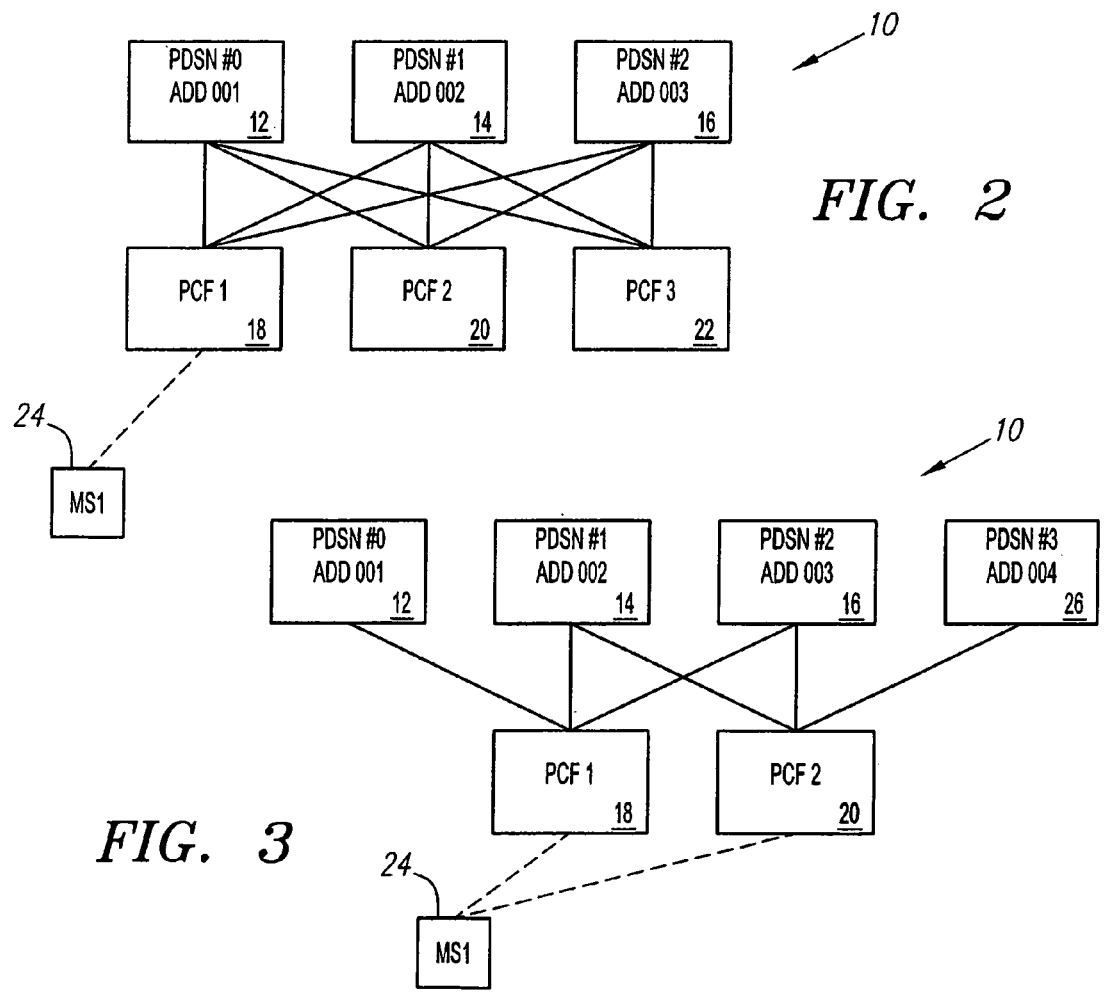
*FIG. 2*
*FIG. 3*

SYSTEM AND METHOD FOR PACKET DATA SERVICING NODE (PDSN) INITIAL ASSIGNMENT AND RESELECTION

BACKGROUND OF THE INVENTION

This invention generally concerns wireless communications and, more particularly, a system and method for assigning a Packet Data Serving Node (PDSN) to a wireless mobile station (MS), to provide packet data services in a third-generation (3G) code division multiple access (CDMA) communication system.

In the second generation CDMA systems specified by the IS-95B standard, uplink data bursts from a MS to base station are limited to a small number of frames, typically 8 or less. The data rate is limited to 4.8 kbps, i.e., inferior to the one used by the users active on the dedicated (voice) channels, which is 9.6 or 14.4 kilobits per second (kbps). The 3G CDMA, as described in IS-2000 body of standards, is being designed to accommodate both longer messages (more frames per message) and higher data rates to support the communication packetized data. Data rates of 384 kbps are envisioned. The ability of the 3G CDMA to communicate packet data will permit users to seamlessly access the Internet with a computer through a wireless telephone.

The transfer of large volumes of data between the MS and the PDSN portal to the Internet will be aided by changing the 3G CDMA system from the traditional PSTN circuit-switched system, where the data network communication must be routed through the mobile switching center (MSC), to a system where the PDSN can locally connect to a radio access network (RAN) base station controller (BSC) using frame relay, or some other link-layer transport capable of carrying Internet protocol (IP) data packets. The linkage between the wireless system and the Internet can be more peer-to-peer and, therefore, simpler and faster, if the packet data protocol can be maintained across the PDSN.

FIG. 1 illustrates the architecture for the 3G CDMA radio access network (RAN), prior art. The packet control function (PCF) and PDSN are two new entities defined by the third-generation Partnership Project 2 (3GPP2) and are only relevant to packet data calls. The cardinality of PDSN and PCF association is many-to-many, meaning that it will be typical for many PCFs to be connected to each PDSN. Likewise, it will be typical for many PDSNs to be connected to each PCF.

When a packet data call is first established, by an MS request for example, a BS and associated BSC are selected as elements in the link. Typically, the BSC is associated with a particular PCF, which may even be co-located at the BS. The PCF must be connected to a PDSN, or a PDSN must be (initially) selected for the MS. There is currently no IS-2000 standard for the initial PDSN assignment.

Furthermore, the packet data link between the MS and PDSN, once initially selected, may become dormant as the MS ceases to communicate packet data. In this situation the air interface traffic and control channels are released, but the point-to-point (PPP) connection between the PDSN and the MS are maintained. It is foreseeable that a dormant MS will roam. Regardless of the relationship between PCFs and BCSs, a dormant MS will roam to a different packet zone (i.e. a new PCF). The new PCF must be notified and it must then establish a new connection to one of the PDSNs. It is highly desirable that the new PCF selects the PDSN that was previously selected by the old PCF. In this manner, the overhead required to reestablish a PPP connection can be minimized, even as dormant handoff occurs between the old and new PCFs, where the previous PDSN already has the PPP connection.

The current 3G CDMA network architecture does not have an interface or a mechanism defined to inform the new PCF of the PDSN which was previously selected by the old PCF, nor is there a third entity that overlooks all resources in the entire network.

In would be advantageous if there was a way for the same PDSN to be selected for packet data communications to a MS in the dormant state, in the event that a new PCF must be selected.

It would be advantageous if the same PDSN could be selected in a MS dormant state reselection process using the existing network architecture.

It would be advantageous if the same PDSN could be selected in a MS dormant state reselection process without the PCF and PDSN units having special knowledge of each other, without special network communications, or without the use of an independent network entity to control dormant state reselections.

SUMMARY OF THE INVENTION

A method is provided for selecting a PDSN for packet data communications with a MS in a wireless communication system. The method comprises: generating a record of unique PDSN (identification) numbers; and selecting a PDSN identification (Id) number in response to the number of PDSN Id numbers in the record. The selection of the PDSN is also responsive to the MS International Mobile Station Identifier (IMSI).

In one aspect of the invention, the wireless communication system includes a plurality of m PCFs and a plurality of n PDSNs with unique IP addresses. Then, the method comprising: at each PCF, generating a record of PDSN Id numbers; and selecting the PDSN Id number in response to the total number (n) of PDSN Id numbers in the record, and in response to the MS IMSI.

The record of PDSN Id numbers is a table with an ordered sequence of the PDSN Id numbers cross-referenced to the PDSN IP addresses. The selection of the first PDSN Id number includes dividing the first MS IMSI by the number of (a) PDSNs in the table. Specifically, the selection of the first PDSN Id number includes selecting the PDSN with the number equal to the remainder in the quotient, when the first MS IMSI divided by n.

Not all the PDSNs listed in the selection table need be connected to the first PCF hosting the table. When the first PCF is not connected to the IP address associated with the first PDSN Id number, the connection cannot be made. Then, the method further comprises reselecting an alternate PDSN Id number, after the first PDSN Id number has been calculated. In one aspect of the invention, the reselection of an alternate PDSN Id number includes varying the first PDSN Id number, typically by adding "1", and dividing that varied number by n. Then, the PDSN with the number equal to the remainder in the quotient is selected.

Alternately, the reselection of an alternate PDSN Id number includes: removing the first PDSN Id number and associated IP address from the table; dividing the MS IMSI by the number of PDSNs remaining in the table; and selecting the PDSN Id number equal to the remainder in the quotient.

A wireless communication system for communicating packet data is also provided. The system comprises a first mobile station (MS) having a unique identification number (Id), such as its IMSI, and a transceiver for wireless packet data communications. The system comprises a plurality of m PCFs. Each PCF has a port for packet data communications with MSs, and with at least one of a plurality of n PDSNs. Each PDSN has a port for packet data communications, a unique IP address, and a unique (identification) number. Each PCF includes a table with an ordered sequence of the n PDSN Id numbers cross-referenced with the n IP addresses. Because of the common ordering of PDSN Id numbers in the tables, each PCF selects the same PDSN Id number for packet data communications involving the first MS. The selection process is responsive to the first MS Id, and the number of PDSNs in the table.

BRIEF DESCRIPTION OF THE DRAWINGS

FIG. 1 illustrates the architecture for the 3G CDMA Radio Access Network (RAN), prior art.

FIG. 2 depicts an exemplary connection of PCF units and PDSN units in a wireless communication system.

FIGS. 3 and 4 depict exemplary partially-connected network of PCF and PDSN units.

DETAILED DESCRIPTION OF THE PREFERRED EMBODIMENT

Figure 4:
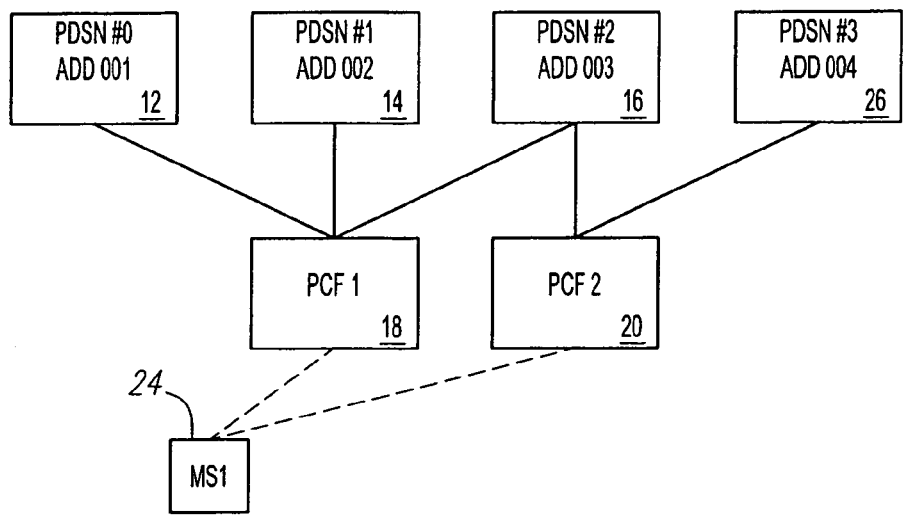

In short, the heart of the invention is a methodology embodied in a set of machine executable instructions. Typically, the instructions are written in a medium which can be accessed as memory by a computer, or which can be read by a computer. The set of instructions are typically embodied as a computer application which orders the computer microprocessor to perform the series of steps needed to cause a PCF to select a PDSN in accordance with the algorithm described in detail below.

A PDSN table must be configured at PCF. Each PCF maintains a table that includes all PDSNs it is connected to. Each table entry must contain (but is not limited to) a PDSN identification (Id) number, and an IP Address associated with the PDSN. It is important that the PDSN Id numbers are assigned consistently, stored in a predetermined ordered sequence (ascending or descending) in all PCFs. An example of such a table, such as might be configured in a PCF is shown below (Table 1).

TABLE 1

| PDSN Number | IP Address |
|---|---|
| 0 | aaaa |
| 1 | bbbb |
| ... | ... |
| n − 1 | xxxx |

The PDSNs are (locally) numbered from 0 to (n−1) and are stored in ascending order based on PDSN IP addresses. It is assumed that aaaa<bbbb< . . . <xxxx, and that n is the total number of PDSNs available to this PCF. As explained in more detail below, a PDSN can be entered into a selection table, even if that PDSN is not connected to the PCF hosting the table.

The PCF determines which PDSN to select for a particular MS based on the unique identification number (Id) of the MS. Typically, the IMSI is used. Then, the following calculation is performed:

PDSN No.=(Mobile IMSI) modulo n

It is understood that modulo n is a computational process where the remainder of a quotient is used as the answer. In this case the quotient is the MS IMSI divided by n. Note that n is the total number of locally available PDSNs to this PCF, not that of the entire network. However, when the network is fully connected, as explained below, the "local" n becomes the total number of PDSNs in the entire network.

FIG. 2 depicts an exemplary connection of PCF units and PDSN units in a wireless communication system 10. There are n PDSN units with the PDSN Id Nos. of "0" (12), "1" (14), and "2" (16), where n is equal to three. The respective IP addresses of PDSN units 12–16 are "001", "002", and "003", shown in Table 2 corresponding to an ordered sequence of PDSN Id numbers. Also shown in FIG. 2 are m PCF units, PCF 1 (18), PCF 2 (20), and PCF 3 (22), where m is equal to three. The PCF units 10–22 are all configured with a PDSN initial selection table. Table 2 is the PDSN selection table for PCF 1 (18). Both the PCF and PDSN units have ports for the communication of packet data. A first MS 24 is shown having a transceiver for the communication of packet data. The first MS 24 is connected to the first PCF 18 through other elements in the system 10, not shown. PCF 1 (18) is shown assigned to interface the first MS 24 with a PDSN.

TABLE 2

| PDSN Number | IP Address |
|---|---|
| 0 | 001 |
| 1 | 002 |
| 2 | 003 |

Assuming that the first MS 24 has an IMSI of 3,000,001, then the division of 3,000,001 by n (3) yields a remainder of "1". PDSN 1 (14) is chosen having the IP address of "002".

If the selected PDSN is not available, for reasons such as lost of connection, exceeding PDSN capacity, or simply no existing physical link, the PCF re-selects an alternative PDSN from the table, based on Mobile Station IMSI. This continuous selection process may iterate for a maximum of (n−1) times, until a PDSN is finally selected.

In one aspect of the invention, the continuous selection calculates a reselected PDSN as follows:

PDSN No.=(last selected PDSN No.+1) modulo n

In terms of the example given above where n=3 and the IMSI is 3,000,001:

PDSN No.=(1+1) modulo 3=2

Now PDSN 2 (16) is chosen having the address of "003". One problem with this reselection method is that there is a statistical tendency for MSs to reselect a common PDSN, causing a load imbalance in the system.

In another aspect of the invention the reselection process is handled differently. The number n is reduced by one, and the calculation repeated as follows:

PDSN No.=(Mobile IMSI) modulo (n−1)

However, this process does not always work. In terms of the example given above where n=3 and the IMSI is 3,000,001:

PDSN No.=(3,000,001) modulo 2=1, which is the same result received in the initial selection where PDSN 1 (14) was selected. That is, the reselection process failed to select a new PDSN. However, this concept can be made to work with modifications. One modification involves temporarily removing the last selected PDSN Id No. from the table, and renumbering the table.

For example, assuming that the initial selection process selects PDSN 1 (14) (i.e. PDSN No.=IMSI % 3=1), but PDSN 1 (14) is not available. Then, the PDSN table is temporarily changed, for this mobile 24 only, to Table 3. Alternately stated, Table 3 is the PDSN selection table of PCF 1 (18), modified for the reselection process, when the initially selected PDSN is not available.

TABLE 3

| PDSN No. | IP Address |
|---|---|
| 0 | 001 |
| 1 | 003 |

The old PDSN 1 (14) is temporarily removed from the table, and the old PDSN 2 (16) now becomes PDSN 1, as a result of keeping the PDSN Id numbers in an ordered sequence, or ascending re-ordering. The continuous selection uses the updated table to select between PDSN of address "001" and "003" using IMSI % (modulo) 2 in this example. After a successful continuous selection, the original PDSN table (with three entries in this example, Table 2) is restored for next normal Selection as described above.

FIGS. 3 and 4 depict exemplary partially-connected network of PCF and PDSN units. To increase the likelihood of re-selecting the same PDSN in a partially connected network, more rows can be inserted in the PDSN table (through network management), so that all PDSNs in a cluster are uniquely numbered, and the neighboring PCFs use the same table. Table 4, below, depicts the PDSN selection tables configured in PCF 1 (18) and PCF 2 (20) of FIG. 3.

TABLE 4

| Before Adjustment: (assume IP address a < b < c < d and ascending ordering used) | | | |
|---|---|---|---|
| @PCF1: PDSN No. | IP Address | @PCF2: PDSN No. | IP Address |
| 0 | 001 | 0 | 002 |
| 1 | 002 | 1 | 003 |
| 2 | 003 | 2 | 004 |
| After Adjustment | | | |
| @PCF1: PDSN No. | IP Address | @PCF2: PDSN No. | IP Address |
| 0 | 001 | 0 | "dummy" address flag no connection |
| 1 | 002 | 1 | 002 |
| 2 | 003 | 2 | 003 |
| 3 . . . | "dummy" address flag no connection | 3 | 004 |

With respect to FIG. 3 and Table 4, PCF 1 (18) is shown connected to PDSN 0 (12), PDSN 1 (14), and PDSN 2 (16). PCF 2 (20) is shown connected to PDSN 2 (16) and PDSN 3 (26). If the first MS 24 enters the dormant mode, and is reassigned to PCF 2 (20) as a result of roaming, it would be desirable if PCF 2 (20) selects the same IP address that PCF 1 (18) was using for packet data communications. In a fully connected system, the selection process can be forced to yield the same IP address for the first MS 24, regardless of which PCF is assigned to the first MS 24. In a system that is not fully connected the same result is guaranteed if the selected PDSN happens to be connected to every PCF. Assuming that the first MS IMSI is still 3,000,001, and n is equal to 4, the first PCF 18 selects PDSN 1 (14) as follows:

PDSN Id No.=(3,000,001) modulo 4=1

If the first MS 24 is later assigned to the second PCF 20, the selection process selects the same PDSN Id number, because the PCFs use the same sequence in their tables. Because the first PCF 18 and the second PCF 20 are both connected to PDSN 1 (14) the IP address is maintained without the requirement of a new PPP being established.

Table 5, below, depicts the PDSN selection tables configured in PCF 1 (18) and PCF 2 (20) of FIG. 4.

TABLE 5

| Before Adjustment: (assume IP address a < b < c < d and ascending ordering used) | | | |
|---|---|---|---|
| @PCF1: PDSN No. | IP Address | @PCF2: PDSN No. | IP Address |
| 0 | 001 | 0 | 003 |
| 1 | 002 | 1 | 004 |
| 2 | 003 | | |
| After Adjustment | | | |
| @PCF1: PDSN No. | IP Address | @PCF2: PDSN No. | IP Address |
| 0 | 001 | 0 | "dummy" address flag no connection |
| 1 | 002 | 1 | "dummy" address flag no connection |
| 2 | 003 | 2 | 003 |
| 3 . . . | "dummy" address flag no connection | 3 | 004 |

FIG. 4 and Table 5 illustrate a situation similar to the example of FIG. 3 (Table 4), except that the second PCF 20 is not connected to PDSN 1. When the first MS 24 is assigned to the second PCF 20, the table will select PDSN 1 (14) just as the first PCF 18 did. This is because the tables have the same ordered sequence of PDSN Id numbers. However, because the second PCF 20 is not connected to PDSN 1 (14), a different PDSN must be selected. The reselection process that follows has been described in detail above.

The invention advantageously ensures that the first mobile's PPP connection is maintained for the duration of a packet call as best as possible. The likelihood of selecting the same PDSN when a MS roams to a new PCF is a function of the actual PCF-PDSN connectivity at the new and old PCF. Although the selection process does not guarantee consistent PDSN selections if the network is deployed such that PDSNs and PCFs are not fully connected, the probability of selecting the same PDSN increases as the connectivity increases. In the degenerate case (full connectivity), this selection algorithm always selects the same PDSN for a given MS Id, because every PCF has the same PDSN table and uses the same n (the "global" n) for modulo operation.

The unique selection process described herein is backward and forward compatible. The selection method can be implemented without a need for signaling or architecture changes to the existing 3G CDMA network architecture, so that it is backward compatible. The selection process affects only a single network component, the PCF. The software required to support enhancements and changes to future all-IP architecture is easily modified, so the PDSN selection is forward compatible.

Figure 5:
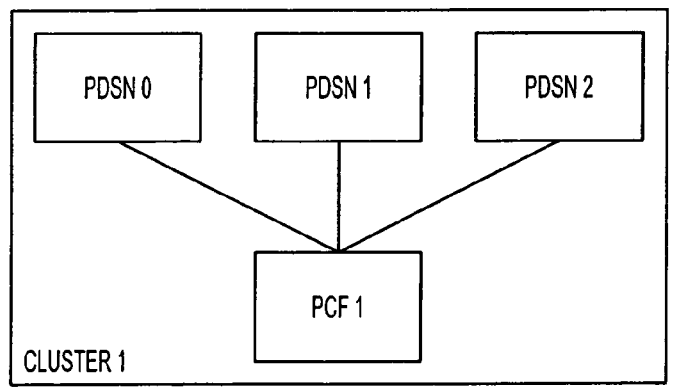
FIG. 5 depicts the addition of a PDSN unit to a network of PCF clusters.
Figure 5:
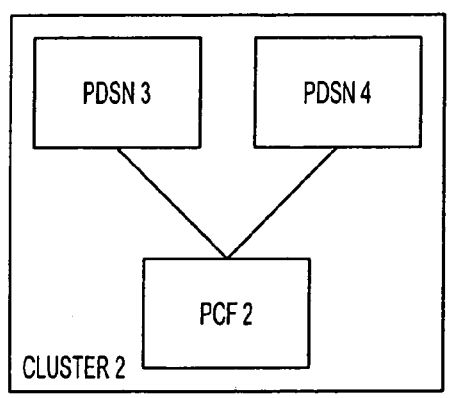

FIG. 5 depicts the addition of a PDSN unit to a network of PCF clusters. The selection method also addresses scalability, because the n used for modulo operation is the number of PDSNs locally available to the PCF. When removing a PDSN and the associated physical link, "dummy" entries can be used to replace the removed PDSN so that other entries in a PDSN table are not changed. PDSN selections will therefore not be disturbed. When adding a PDSN, only the (local) PCFs that need to add or remove a PCF-PDSN physical link need to be updated, not the entire network. Therefore, only the locally affected PCFs may suffer from re-selecting a different PDSN in this case (and if MS roams).

Expanding cluster 2, where a new PDSN (PDSN 4) is being added, will not affect cluster 1. Only those PCFs that will add a direct link with the new PDSN are effected, such as PCF 2. Therefore, all MSs that roam within cluster 1 will not be affected.

Figure 6:
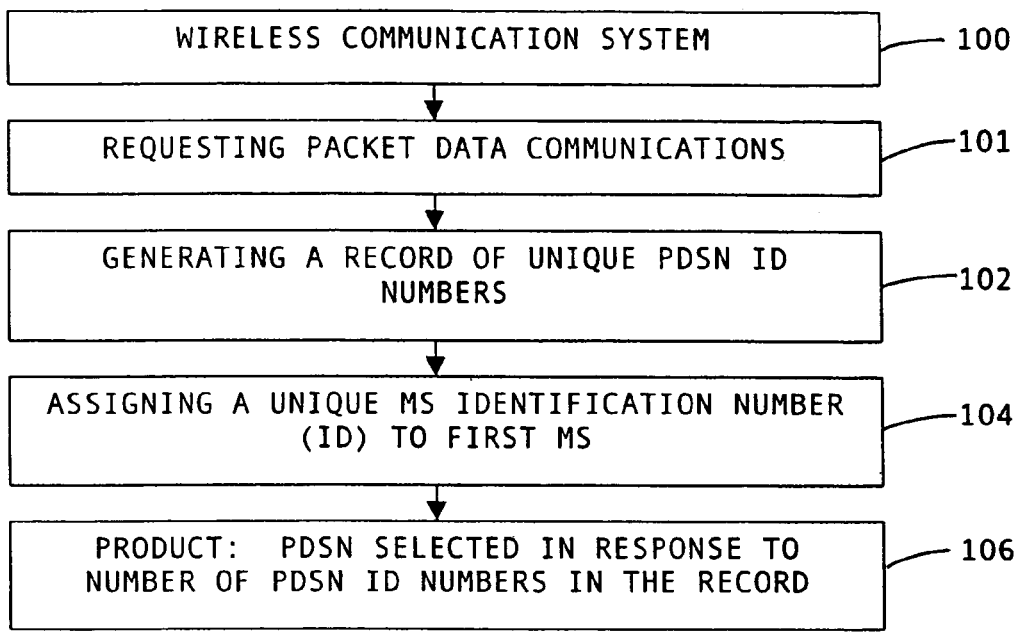
FIG. 6 is a flowchart illustrating the present invention method for selecting a PDSN for packet data communications with a first MS.

FIG. 6 is a flowchart illustrating the present invention method for selecting a PDSN for packet data communications with a first MS. Step 100 includes a wireless communication system with at least one Packet Control Function (PCF) and at least one Packet Data Servicing Node (PDSN). Although the method describes a sequence of numbered steps for clarity, no order should be inferred from the numbering unless explicitly stated. Step 102 generates a record of unique PDSN Id numbers. Step 104 assigns a unique MS identification number (Id) to the first MS. Step 106 is a product where a PDSN is selected in response to the number of PDSN Id numbers in the record. The selection of the PDSN in Step 106 also includes the selection of the PDSN being responsive to the first MS Id.

In some aspects of the invention the system in Step 100 includes n PDSNs, with each PDSN in the system having a unique Internet protocol (IP) address. Then, the generation of the record of PDSN addresses in Step 102 includes creating a table with an ordered sequence of the PDSN Id numbers cross-referenced to the IP addresses. The selection of the PDSN in Step 106 includes dividing the first MS Id by the number of (n) PDSNs. More specifically, the selection of the PDSN in Step 106 includes selecting the PDSN Id number equal to the remainder in the quotient, when the first MS Id divided by n.

In some aspects of the invention the method further comprises Step 101, where the first MS communicates with a first PCF to request packet data communications. The generation of the table of PDSN addresses in Step 102 includes the first PCF having a table of cross-referenced PDSN Id numbers and IP addresses. The selection of the PDSN Id number in Step 106 includes using the table of the first PCF to calculate the PDSN Id number.

Figure 7:
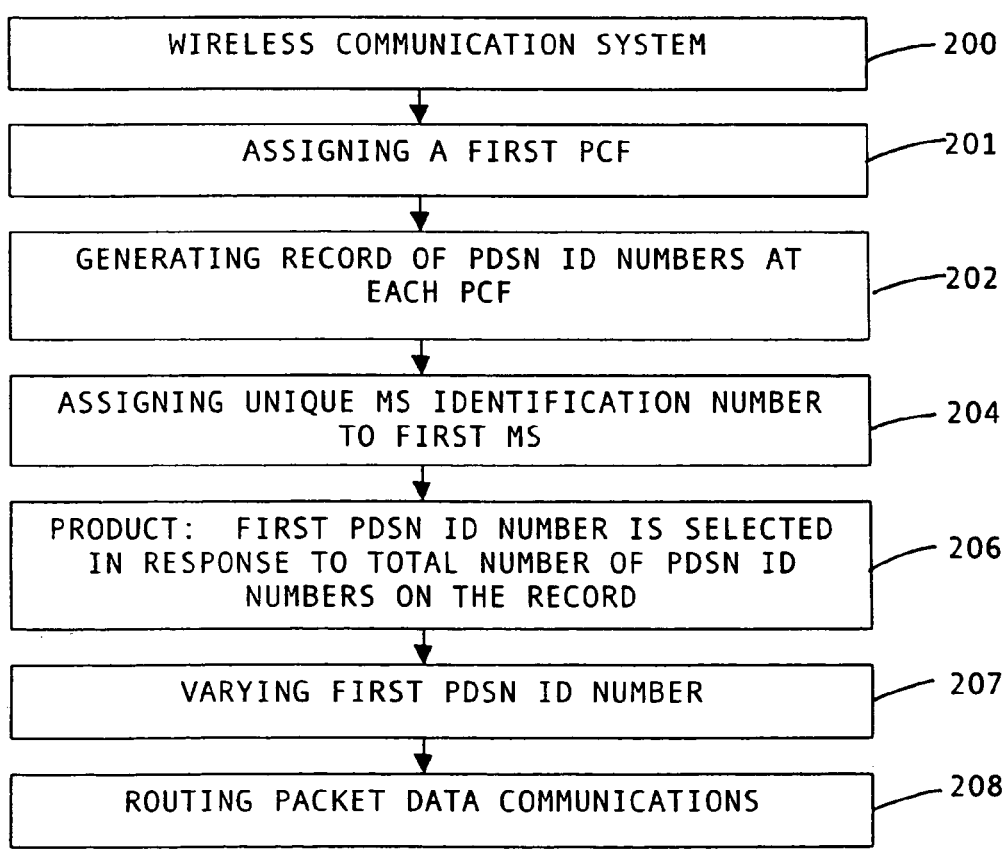
FIG. 7 is a flowchart illustrating an alternate depiction of the present invention method for selecting a PDSN for packet data communications with a first MS.

FIG. 7 is a flowchart illustrating an alternate depiction of the present invention method for selecting a PDSN for packet data communications with a first MS. Step 200 includes a wireless communication system with a plurality of m Packet Control Functions (PCFs) and a plurality of n Packet Data Servicing Node (PDSNs) having unique Internet protocol (IP) addresses. Step 202, at each PCF, generates a record of PDSN Id numbers. Step 204 assigns a unique MS identification number (Id) to the first MS. Typically, the IMSI number is used. Step 206 is a product where a first PDSN Id number is selected in response to the total number (n) of PDSN Id numbers in the record. The selection of the first PDSN Id number in Step 206 also includes selecting the first PDSN Id number in response to the first MS Id.

In some aspects of the invention Step 201 assigns a first PCF, to establish packet data communications between the first MS and a PDSN. Then, the selection of the first PDSN Id number in Step 206 includes the first PDSN Id number being selected, regardless of which PCF is assigned. Step 208 routes packet data communications between the first MS and the IP address corresponding to the selected PDSN Id number, through the assigned PCF.

The generation of the record of PDSN Id numbers in Step 202 includes creating a table with an ordered sequence of the PDSN Id numbers cross-referenced to the IP addresses. Then, the selection of the first PDSN Id number in Step 206 includes dividing the first MS Id by the number of (n) PDSNs in the table. Further, the selection of the first PDSN Id number in Step 206 includes selecting the PDSN Id number equal to the remainder in the quotient, when the first MS Id divided by n.

In some aspects of the invention, the system of PDSNs and PCFs are not fully connected, which complicates the PDSN selection process. That is, Step 200 includes the first PCF being connected to a IP address corresponding to the second PDSN Id number, but not to the IP address corresponding the first PDSN identification number. Then, Step 207 reselects an alternate PDSN Id number, after the first PDSN Id number has been calculated.

In some aspects of the invention, the reselection of an alternate PDSN Id number in Step 207 includes varying the first PDSN Id number, dividing that varied first PDSN Id number by n, and selecting the PDSN Id number equal to the remainder in the quotient. The first PDSN Id number can be randomly varied for the reselection of an alternate PDSN Id number, or varied by adding a "1".

Alternately, the reselection of an alternate PDSN Id number in Step 207 includes: removing the first PDSN Id number and associated IP address from the table; dividing the first MS Id by the number of PDSNs remaining in the table; and selecting the PDSN Id number equal to the remainder in the quotient.

With respect to load balancing, the present invention selection method causes the load of services to be evenly partitioned among locally available PDSNs on the basis of the MS IMSI. When approaching PDSN-PCF full connectivity, the load is evenly distributed in the entire network. The present invention uses a simple and reliable algorithm. It is easy to administer, impacts only a single network entity, the PCF, and it requires few resources, just memory and computing power. Although specific examples have been presented to clarify the concept of the invention, the present invention is not limited to the particular embodiments mentioned above. Other variations and embodiments will occur to those skilled in the art.

What is claimed is:

1. In a wireless communication system including at least one Packet Control Function (PCF) and at least two Packet Data Servicing Nodes (PDSNs), a method for selecting a PDSN for packet data communications with a first mobile station (MS), the method comprising:

generating a record of unique PDSN Id numbers at the at least one PCF communicatively coupled between the first mobile station and the at least two PDSNs; and assigning a unique MS identification number (Id) to the first mobile station; and selecting a PDSN in response to the number of PDSN Id numbers in the record and to the first MS Id.

2. The method of claim 1 wherein the system includes n PDSNs, with each PDSN in the system having a unique Internet protocol (IP) address, in which the generation of the record of PDSN Id numbers includes creating a table with an ordered sequence of the PDSN Id numbers cross-referenced to the IP addresses.

3. The method of claim 2 in which the selection of the PDSN includes dividing the first MS Id by the number of (n) PDSNs.

4. The method of claim 3 in which the selection of the PDSN includes selecting the PDSN Id number equal to the remainder in the quotient, when the first MS Id divided by n.

5. The method of claim 4 further comprising: the first MS communicating with a first PCF to request packet data communications; in which the generation of the table of PDSN addresses includes the first PCF having a table of cross-referenced PDSN Id numbers and IP addresses; and in which the selection of the PDSN Id number includes using the table of the first PCF to calculate the PDSN Id number.

6. In a wireless communication system including a plurality of m Packet Control Functions (PCFs) and a plurality of n Packet Data Servicing Nodes (PDSNs) with unique Internet protocol (IP) addresses, a method for selecting a PDSN for packet data communications with a first mobile station (MS), the method comprising:

at each PCF, generating a record of PDSN Id numbers, wherein said each PCF is communicatively coupled between the first mobile station and one of the PDSNs;

assigning a unique MS identification number (Id) to the first MS; and selecting a first PDSN Id number in response to the first MS Id.

7. The method of claim 6 in which the selection of the first PDSN Id number includes selecting the first PDSN Id number in response to the total number (n) of PDSN Id numbers in the record.

8. The method of claim 7 further comprising: assigning a first PCF to establish packet data communications between the first MS and a PDSN; and in which the selection of the first PDSN Id number includes the first PDSN Id number being selected, regardless of which PCF is assigned.

9. The method of claim 8 in which the generation of the record of PDSN Id numbers includes creating a table with an ordered sequence of the PDSN Id numbers cross-referenced to the IP addresses.

10. The method of claim 9 in which the selection of the first PDSN Id number includes dividing the first MS Id by the number of (n) PDSNs in the table.

11. The method of claim 10 in which the selection of the first PDSN Id number includes selecting the PDSN Id number equal to the remainder in the quotient, when the first MS Id divided by n.

12. The method of claim 11 further comprising: routing packet data communications between the first MS and the IP address corresponding to the selected PDSN Id number, through the assigned PCF.

13. The method of claim 12 wherein the first PCF is connected to a IP address corresponding to the second PDSN Id number, but not to the IP address corresponding the first PDSN identification number; and the method further comprising: reselecting an alternate PDSN Id number, after the first PDSN Id number has been calculated.

14. The method of claim 13 in which the reselection of an alternate PDSN Id number includes varying the first PDSN Id number, dividing that varied first PDSN Id number by n, and selecting the PDSN Id number equal to the remainder in the quotient.

15. The method of claim 14 in which the first PDSN Id number is randomly varied for the reselection of an alternate PDSN Id number.

16. The method of claim 14 in which the first PDSN Id number is varied by "1".

17. The method of claim 13 in which the reselection of an alternate PDSN Id number includes: removing the first PDSN Id number and associated IP address from the table; dividing the first MS Id by the number of PDSNs remaining in the table; and selecting the PDSN Id number equal to the remainder in the quotient.

18. A wireless communication system for communicating packet data, the system comprising:

a first mobile station (MS) having a unique identification number (Id), the first MS having a transceiver for wireless packet data communications;

a plurality of m Packet Control Functions (PCFs), each PCF having a port for packet data communications with MSs and a port for packet data communications with an Internet protocol (IP) address;

a plurality of n Packet Data Servicing Nodes (PDSNs), each PDSN having a port for packet data communications with PCFs, a unique IP address and a unique identification (Id) number, wherein each PCF is communicatively coupled between the first mobile station and one of the PDSNs;

in which each PCF includes a table with an ordered sequence of the n PDSN Id numbers cross-referenced with the IP addresses; and in which each PCF selects a first PDSN Id number for packet data communications with the first MS in response to the first MS Id.

19. The system of claim 18 in which each PCF selects the first PDSN Id number in response to the number of PDSNs represented in the table.

20. The system of claim 19 in which the PCF selects the first PDSN Id number by dividing the first MS Id by the number of (n) PDSNs in the table.

21. The system of claim 20 in which the PCF selects the first PDSN Id number by selecting the PDSN Id number equal to the remainder in the quotient, when the first MS Id divided by n.

22. The system of claim 21 in which a first PCF is connected to an IP address corresponding to the second PDSN Id number, and in which the first PCF is not connected to the IP address corresponding to the first PDSN Id number; and in which the first PCF reselects an alternate PDSN Id number, after the first PDSN Id number has been calculated.

23. The system of claim 22 in which the first PCF reselection of an alternate PDSN Id number includes varying the first PDSN Id number, dividing the varied first PDSN Id number by n, and selecting the PDSN Id number equal to the remainder in the quotient.

24. The system of claim 23 in which the first PCF randomly varies the first PDSN Id number for reselection of an alternate PDSN Id number.

25. The system of claim 23 in which the first PCF varies the first PDSN Id number by "1".

26. The system of claim 22 in which the first PCF reselects an alternate PDSN Id number by removing the first PDSN Id number and associated IP address from the table, dividing the first MS Id by the number of PDSNs remaining in the table, and selecting the PDSN Id number equal to the remainder in the quotient.

* * * * *